(12) United States Patent
Fritsch et al.

(10) Patent No.: US 7,953,102 B2
(45) Date of Patent: *May 31, 2011

(54) SYSTEM AND METHOD FOR GENERIC DATA MAPPING BETWEEN WIRELESS COMPONENT APPLICATIONS AND APPLICATION DATA SOURCES

(75) Inventors: Brindusa Fritsch, Toronto (CA); Viera Bibr, Kilbride (CA); Michael Shenfield, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 11 days.

This patent is subject to a terminal disclaimer.

(21) Appl. No.: 12/542,024

(22) Filed: Aug. 17, 2009

(65) Prior Publication Data
US 2009/0296678 A1    Dec. 3, 2009

Related U.S. Application Data

(63) Continuation of application No. 11/107,913, filed on Apr. 18, 2005, now Pat. No. 7,586,926.

(51) Int. Cl.
*H04L 12/28* (2006.01)
(52) U.S. Cl. ............... 370/401; 370/338; 707/101
(58) Field of Classification Search .......... 370/401, 370/338; 707/101
See application file for complete search history.

(56) References Cited

U.S. PATENT DOCUMENTS

| | | |
|---|---|---|
| 2002/0184213 A1 | 12/2002 | Lau et al. |
| 2005/0027731 A1 | 2/2005 | Reval |
| 2006/0230057 A1* | 10/2006 | Kosov et al. ............ 707/102 |
| 2007/0130571 A1 | 6/2007 | Ringseth et al. |
| 2007/0204279 A1 | 8/2007 | Warshavsky et al. |

FOREIGN PATENT DOCUMENTS

WO    2004/059939 A2    7/2004

OTHER PUBLICATIONS

Office Action issued by the Canadian Intellectual Property Office dated Mar. 11, 2010 for corresponding Canadian Patent Application No. 2,543,879.
Examination Report issued by the European Patent Office dated Jul. 25, 2007 for corresponding European Patent Application No. 05 103 101.1.
Extended European Search Report issued by the European Patent Office dated Aug. 9, 2005 for corresponding European Patent Application No. 05 103 101.1.
Further Examination issued by the European Patent Office dated Jun. 11, 2008 for corresponding European Patent Application No. 05 103 101.1.

* cited by examiner

*Primary Examiner* — Barry W Taylor
(74) *Attorney, Agent, or Firm* — Gowling Lafleur Henderson LLP (57) ABSTRACT

An application gateway is configured to facilitate message communication between an application executing on a wireless device and a backend server. The application gateway comprises a message interface, a backend connector and a transformer. The message interface facilitates communication between the wireless device and the application gateway in a compact format. The backend connector facilitates communication between the application gateway and the backend server using a schema-based internal format. The transformer translates data between the compact format and the internal format. The transformer further includes a transformer mapping document for correlating elements in the compact format with elements in the internal format.

14 Claims, 9 Drawing Sheets

SYSTEM AND METHOD FOR GENERIC DATA MAPPING BETWEEN WIRELESS COMPONENT APPLICATIONS AND APPLICATION DATA SOURCES

CROSS REFERENCE TO RELATED APPLICATION

This application is a continuation of earlier nonprovisional application having application Ser. No. 11/107,913 filed Apr. 18, 2005, now U.S. Pat. No. 7,586,926, granted on Sep. 8, 2009, and claims priority under 35 U.S.C. 120 thereto. The disclosure of aforementioned application Ser. No. 11/107,913 is hereby incorporated by reference in its entirety.

This application relates generally to schema-based documents and specifically to a system and method for using such documents to facilitate generic data mapping between wireless component applications and corresponding application data sources.

BACKGROUND OF THE INVENTION

Due to the proliferation of wireless networks, there are a continually increasing number of wireless devices in use today. These devices include mobile telephones, personal digital assistance (PDAs) with wireless communication capabilities, two-way pagers and the like. Concurrently with the increase of available wireless devices, software applications running on such devices have increased their utility. For example, the wireless device may include an application that retrieves a weather report for a list of desired cities or an application that allows a user to shop for groceries. These software applications take advantage of the ability to transmit data of the wireless network in order to provide timely and useful services to users, often in addition to voice communication. However, due to a plethora of different types of devices, restricted resources of some devices, and complexity of delivering large amounts of data to the devices, developing software applications remains a difficult and time-consuming task.

Currently, devices are configured to communicate with Web Services through Internet based Browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of Browsers is that the screens are rendered at runtime, which can be resource intensive. Applications for browsers are efficient tools for designing platform independent applications. Accordingly, different runtime environments, regardless of the platform, execute the same application. However, since difference wireless devices have different capabilities and form factors, the application may not be executed or displayed as desired. Further, browser based application often require significant transfer bandwidth to operate efficiently, which may be costly or even unavailable for some wireless devices.

On the other hand, native applications are developed for a specific wireless device platform, thereby providing a relatively optimized application program for a runtime environment running on that platform. However, a platform dependent application introduces several drawbacks, including having to develop multiple versions of the same application and being relatively large in size, thereby taxing memory resources of the wireless device. Further, application developers need experience with programming languages such as Java and C++ to construct such native applications.

Further, client applications running on wireless devices are often required to transfer data between the wireless device and an application data server, generically referred to as a backend server. Accordingly, an intermediary server facilitates message communication between the wireless device and the backend server. In order to accomplish this, the messages and their parts are mapped between client applications and the backend servers.

However, for the wireless paradigm it is useful to limit the data volume exchanged with a wireless device. Thus, although certain backend servers may provide valuable information, it may be impractical to wirelessly communicate this information in the absence of an accommodating schema transformation that will also optimize the data structure at the handheld level.

Accordingly there is a need for a system and method to facilitate providing a developer with access to a plurality of different backend servers while developing an application in order to overcome some of the disadvantages of the prior art.

SUMMARY OF THE INVENTION

In accordance with the present invention there is provided an application gateway configured to facilitate message communication between an application executing on a wireless device and a backend server, the application gateway comprising: a message interface for facilitating communication between the wireless device and the application gateway in a compact format; a backend connector for facilitating communication between the application gateway and the backend server using a schema-based internal format; and a transformer for translating data between the compact format and the internal format, the transformer including a transformer mapping document for correlating elements in the compact format with elements in the internal format.

In accordance with a further aspect of the present invention there is provided a method for translating data from an internal format used for facilitating communication with a backend server to a compact format used for communicating with a wireless device, the method comprising the steps of: receiving a message in the internal format; retrieving a corresponding transformer mapping document; and mapping data from the received message in the internal format to the compact format in accordance with the transformer mapping document for communication to the wireless device.

In accordance with yet a further aspect of the present invention there is provided a method for translating data from an internal format used for facilitating communication with a backend server to a compact format used for communicating with a wireless device, the method comprising the steps of: receiving a message in the internal format; retrieving a corresponding transformer mapping document; and mapping data from the received message in the internal format to the compact format in accordance with the transformer mapping document for communication to the wireless device.

BRIEF DESCRIPTION OF THE DRAWINGS

An embodiment of the invention will now be described by way of example only with reference to the following drawings in which.

DETAILED DESCRIPTION OF THE PREFERRED EMBODIMENT

Figure 1:
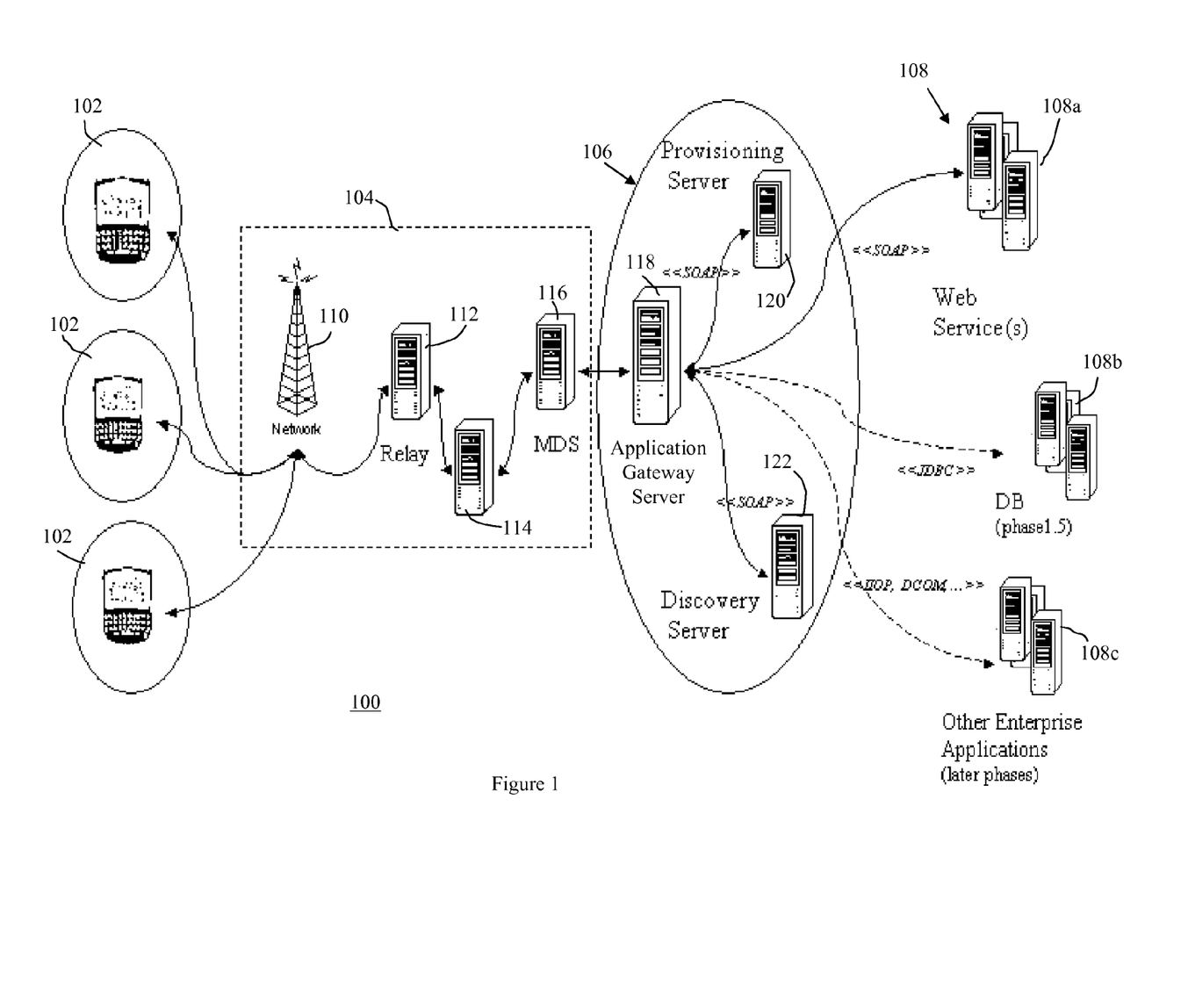
FIG. 1 is a block diagram of a network facilitating wireless component applications.

For convenience, like numerals in the description refer to like structures in the drawings. Referring to FIG. 1, a communication infrastructure is illustrated generally by numeral 100. The communication infrastructure 100 comprises a plurality of communication devices 102, or simply devices 102, a communication network 104, an application gateway 106 and a plurality of backend servers 108.

The devices 102 include both wired and wireless computing devices such as a desktop computer, a laptop or other portable computer, a smart phone, a personal digital assistant (PDA), and the like. The devices 102 are in communication with the application gateway 106 via the communication network 104. Accordingly, the communication network 104 may include several components such as a wireless network 110, a relay 112, a corporate server 114 and/or a mobile data server 116 for relaying data between the devices 102 and the application gateway 106.

The application gateway 106 comprises a gateway server 118 a provisioning server 120 and a discovery server 122. The gateway server 118 is in communication with both the provisioning server 120 and the discovery server 122. The gateway server 110 is further in communication with a plurality of the backend servers 108, such as web services 108a, database services 108b, as well as other enterprise services 108c, via a suitable link. For example, the gateway server 110 is connected with the web services 108a and database services 108b via Simple Object Access Protocol (SOAP) and Java Database Connectivity (JDBC) respectively. Other types of backend servers 108 and their corresponding links will be apparent to a person of ordinary skill in the art. Accordingly, it can be seen that the gateway server 118 acts as a message broker between the devices 102 and the backend servers 108.

Each wireless device 102 is initially provisioned with a service book establishing various protocols and settings, including connectivity information for the corporate server 114 and/or the mobile data server 116. These parameters may include a Uniform Resource Locator (URL) for the application gateway server 118 as well as its encryption key. Alternately, if the wireless device 102 is not initially provisioned with the URL and encryption key, they may be pushed to the wireless device 102 via the mobile data server 116. The mobile device 102 can then connect with the application gateway 106 via the URL of the application gateway server 118.

Figure 2:
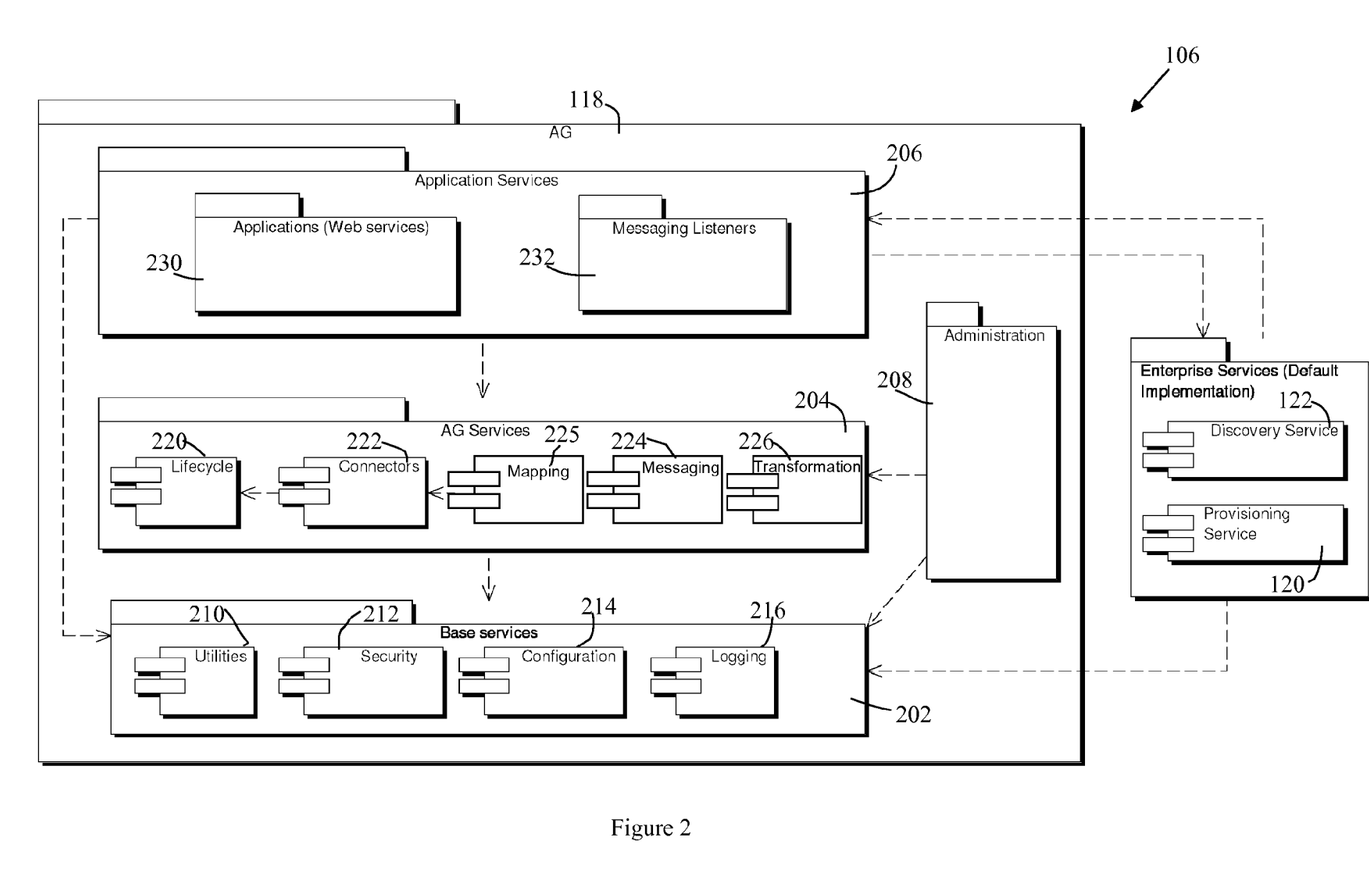
FIG. 2 is a detailed block diagram of the application gateway shown in FIG. 1.

Referring to FIG. 2, a more detailed view of the application gateway 106 is shown. The application gateway server 118 includes three layers of service; a base services layer 202, an application gateway services layer 204 and an application services layer 206. The application gateway server 118 further includes an administration service 208.

A provisioning service 210 and a discovery service 212 are provided by the provisioning server 120 and discovery server 120, respectively.

At the lowest level, the base services layer 202 offers basic, domain independent system services to other components in higher levels. Thus, for example, all subsystems in the application gateway services layer 204 and the application services layer 206 can utilize and collaborate with the subsystems in the base services layer 202. In the present embodiment, the base services layer 202 includes a utilities subsystem 210, a security subsystem 212, a configuration subsystem 214, and a logging subsystem 216.

The application gateway services layer 204 provides wireless component application domain specific services. These services provide efficient message transformation and delivery to backend systems 108 and provide wireless device 102 and component application lifecycle management. In the present embodiment, the application gateway services layer 204 includes a lifecycle subsystem 220, a connector subsystem 222, a messaging subsystem 224, a mapping subsystem 225, and a transformation subsystem 226.

The application services layer 206 sits at the top of the architecture and provides external program interfaces and user interfaces using subsystems provided by the lower layers. For example, various applications such as a service provider lifecycle application, a packaging application and a message listening application provide external program interfaces since they communicate primarily with applications on external systems. Similarly, an administration application provides a user interface by providing a user with ability to access and potentially modify application gateway data and/or parameters.

The administration service 208 is responsible for administrative system messages, administration of the wireless devices 102, runtime administration of the application gateway subsystems, support and display system diagnostics, and administration of default implementations of the provisioning and discovery services. Relevant portions of the application gateway are described in details as follows.

Message Listening Application

The messaging listening application provides an interface for receiving messages from the devices 102 as well as external sources and forwarding them to the messaging subsystem. Further, the message listening application typically authenticates that the source of the message is valid.

Figure 3:
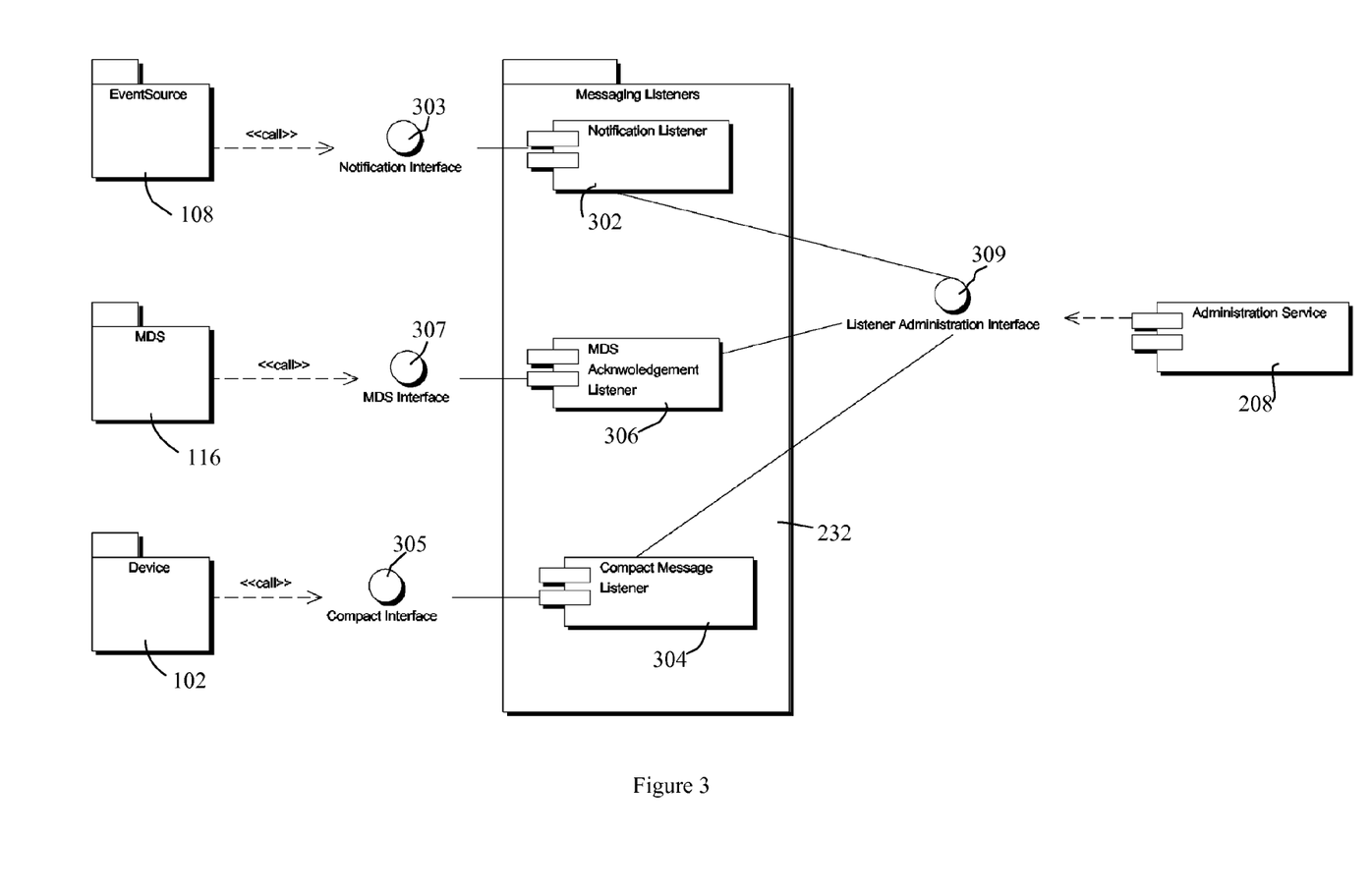
FIG. 3 is a block diagram of a message listening application.

Referring to FIG. 3, the message listening application is shown in greater detail. The message listening application includes several listeners; a notification listener 302, a compact message listener 304, and a mobile data service acknowledgement listener 306. The notification listener 302 receives notification and response messages from event sources 108c via a notification interface 303.

For example, the notification interface 303 may be implemented using Web Service (WS) Eventing. Web services often want to receive messages when events occur in other services, such as the event sources, and applications. A mechanism for registering interest is provided in the art by WS Subscription. WS Subscription defines a protocol for one Web service, referred to as a subscriber, to register interest with another Web service, referred to as an event source for receiving messages about events, referred to as notifications. When the event source notifies the subscriber of an event, it is referred to as WS Eventing.

The compact message listener 304 receives messages from the devices 102 via a compact message interface 305. The mobile data service acknowledgment listener 306 receives and acknowledges notifications from the mobile data service 116 via a mobile data service interface 307. Each of the listeners 302, 304 and 306 receive administrative messages from the administration service 208 via a listener administrative interface 311.

In the present embodiment the listener interfaces 303, 305, 307 and 311 are configured using Hypertext Transfer Protocol/Hypertext Transfer Protocol over Secure Socket Layer (HTTP/HTTPS). However, it will be appreciated by a person skilled in the art that these protocols have been selected as a design choice and other protocols may be used when desired. Accordingly, external systems transmit a HTTP/HTTPS request, which is received by the appropriate listener. The listener takes the message, makes minimal transformations, and forwards it to the messaging subsystem 224. The transformations include copying HTTP header information into message object fields. For example, the HTTP header information may identify the mobile data service 116 and wireless device 102 from which the message originated.

As previously described, the message listening application authenticates that the source of the message is valid, be it the mobile date service 116, the wireless device 102 or event source 108. Further, if reliable messaging is required, service availability is ensured and the listeners deal with availability attack solutions. In order to facilitate this, the messaging subsystem defines a threshold for a maximum number of messages and connections for a given time period from any backend server 108, component application or device 102. The administrator can modify this threshold as desired, as well as allow for specific exceptions via the administration service 208.

Further, since message interception and replay attack are possible, the listeners detect and prohibit this attack using mechanisms that identify replayed messages. These mechanisms typically include the use of a nonce. A nonce is defined as parameter that varies with time. A nonce can be a timestamp or other special marker intended to limit or prevent the unauthorized replay or reproduction of a message. Because a nonce changes with time, it can be used to determine whether or not a message is original, or a replay or reproduction of the original message. The use of a nonce for preventing interception and replay attacks is known in the art and need not be described in detail, as standard implementations are utilized.

Further, other technologies, such as sequencing, can also be used to prevent replay of application messages in addition to, or in lieu of, the time timestamp technique. Once again, such techniques are known in the art and need not be described in detail, as standard implementations are utilized.

Messaging Subsystem

The messaging subsystem 224 handles messages that are either system or component application specific. The messaging subsystem 224 is also responsible for the integrity and maintenance of all messages to be delivered by the application gateway 106. Upon receiving a message, the messaging subsystem 224 queues it, optionally stores it (for reliability both to and from the application gateway 106) and prepares it for further delivery to its destination.

Figure 4A:
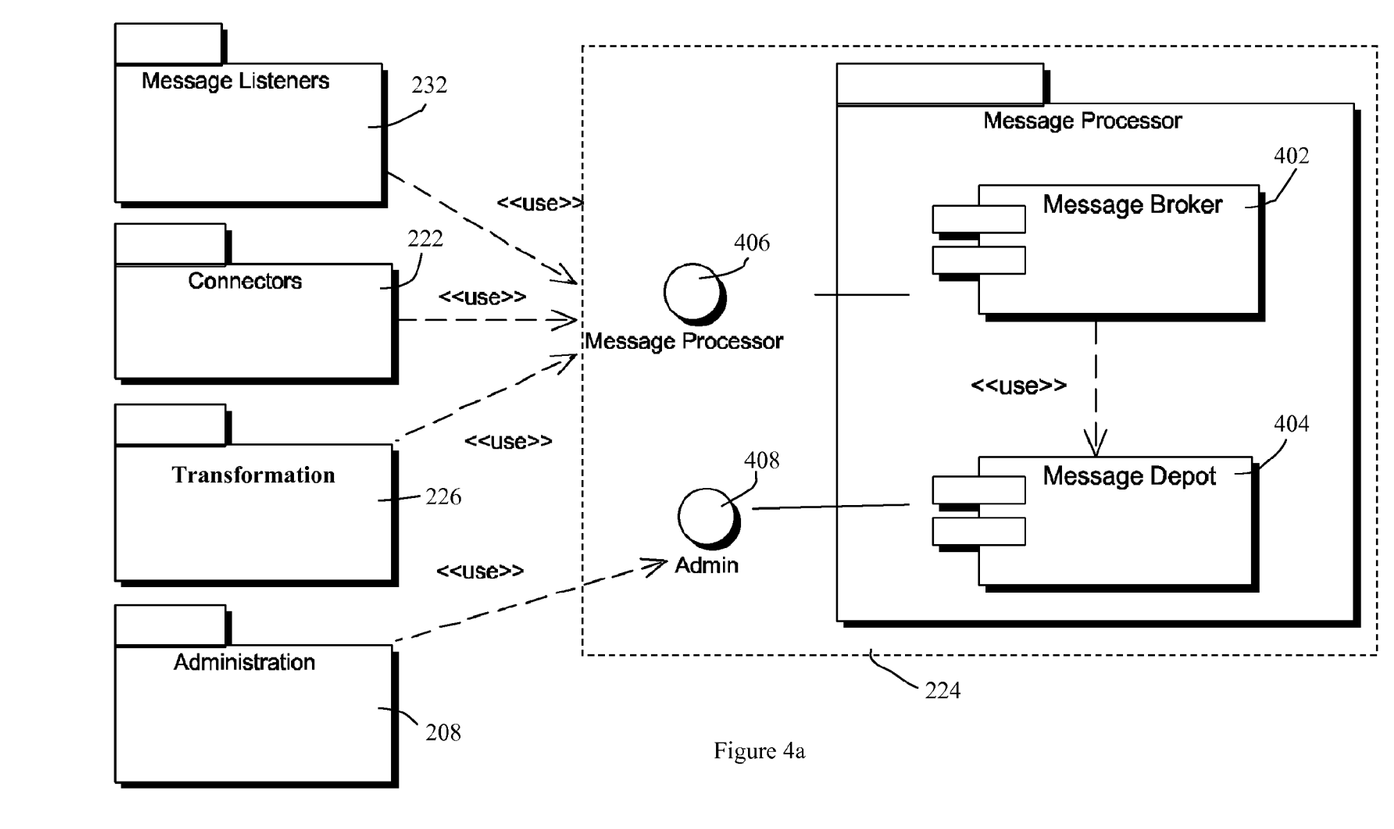
FIG. 4 is a block diagram of a messaging subsystem.

Referring to FIG. 4a, the messaging subsystem 224 is shown in greater detail. The messaging subsystem 224 includes a message broker 402 and a message depot 404. A message processor interface 406 couples the message broker 402 with the message listeners 232, the connector subsystem 222, the transformation subsystem 226 and other application gateway subsystems. A message processor administration interface 408 couples the message depot 404 with the administration subsystem 208 and provides an interface to administer and configure the messaging subsystem 224.

The message broker 402 is responsible for validating, processing and forwarding messages in the appropriate format to the proper connector in the connector subsystem. The message broker 402 communicates with the lifecycle subsystem 220 to retrieve information about wireless devices 102 and component applications. If a message mapping targets multiple wireless devices, the message broker 402 creates a message for each wireless device. The message broker 404 further performs scheduled message maintenance jobs. Primarily, this results in removing expired messages. An administrator can schedule the time and frequency of these maintenance jobs via the administration subsystem.

The message broker 402 further manages subscription information and broadcasts messages to all subscribers when notified.

The message depot 404 is used to store information about messages, any information related to reliable mapping, messaging, subscriptions and correlation information.

Mapping Subsystem

The mapping subsystem 225 provides mappings for use during execution of the application. Typically, when a new application is provisioned on the application gateway, the mapping subsystem 225 generates a pair of mappings that are used by the transformation subsystem 226 during runtime.

Figure 4B:
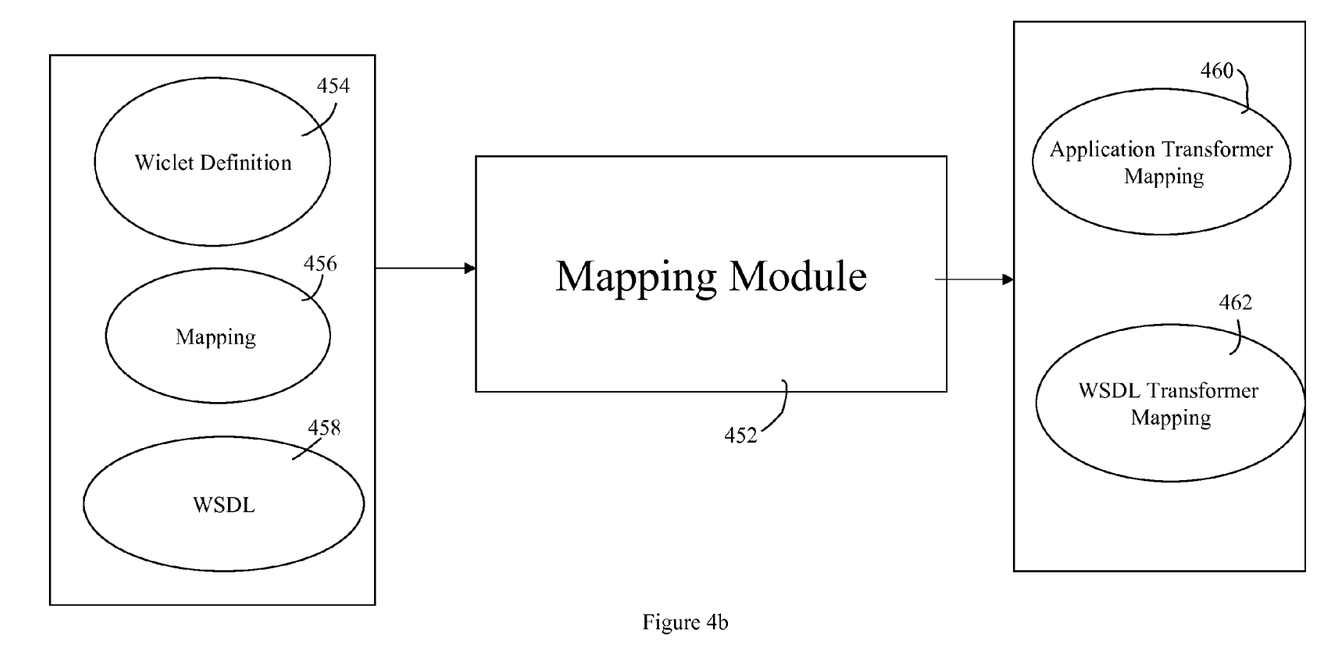

Referring to FIG. 4b, the mapping subsystem 225 is shown in greater detail. The mapping subsystem 225 includes a mapping module 452 that operates on several pieces of data provided in an application bundle for the new application. Such data includes a portion of the application definition 454, a mapping document 456, and a corresponding Web Service Definition Language (WSDL) document.

WSDL is a document written in XML for describing a web service, the details of which will be apparent to a person skilled in the art. Further, since WSDL is inherently extensible, it can be used for allowing WSDL documents to describe services other than web services, such as, for example, a relational database. The use of WSDL extensibility to connect to different backend servers, however, is beyond the scope of the present invention and therefore need not be described in detail.

A complete WSDL definition includes all of the information used to invoke the backend server. Thus, in addition to messages, operations, and interfaces, a WSDL document specifies the location of a backend server and the operations the backend server exposes. Accordingly, a person skilled in the art will appreciate that WSDL provides a way to group messages into operations and operations into interfaces. It also provides a way to define bindings for each interface and protocol combination along with the endpoint address for each one. Thus, the WSDL document effectively decouples the messages for communicating with a backend server from the connectivity information required to make the connection. Developers that want to make it easy for others to access their backend servers, publish their WSDL definitions.

Accordingly, when an application is developed, the application developer or the application development environment provides the component application definition 454, the corresponding WSDL document 458, and the mapping document 456 as part of a bundle. When an application is installed on the application gateway a first time, the mapping module uses the component application definition 454, the corresponding WSDL document 458, and the mapping document 456 for building an application transformation mapping 460 and a WSDL mapping 462.

The application transformation mapping 460 comprises a field binding path for each relevant field in the component application definition 454. The WSDL mapping 462 comprises a mapping for each operation used by the component application definition 454 along with its associated messages, including requests, responses, and notifications.

In operation, the application transformation mapping 460 is used as a binding path for each application message to a lookup table. The WSDL mapping 462 is used to map the messages in the WSDL document to the lookup table. Accordingly, it can be seen that the lookup table acts as an intermediary buffer between messages transmitted between the application gateway and the wireless device and messages transmitted between the application gateway and the backend server. This provides an application developer with the flexibility to alter the presentation or structure of the application, without affecting the communication between the backend server, as long as the mapping 456 accurately reflects the relationship between the application and the WSDL document.

Since WSDL effectively compartmentalizes messages, operations, interfaces and bindings, it will be appreciated that the same mapping 456 can be implemented regardless of the type of backend server with which the component application is in communication. Accordingly using such a mapping mechanism can reduce complexity at the application gateway, thereby enhancing scalability, especially with respect to scalability across a plurality of heterogeneous backend servers.

Referring to Appendix A, a sample, mapping schema used in accordance with the present embodiment is provided. Referring to Appendix B, a sample transformer mapping file for a corresponding component application is provided. A corresponding WSDL file, excluding binding information, for the transformer mapping file in Appendix B is provided in Appendix C.

Transformation Subsystem

Figure 5:
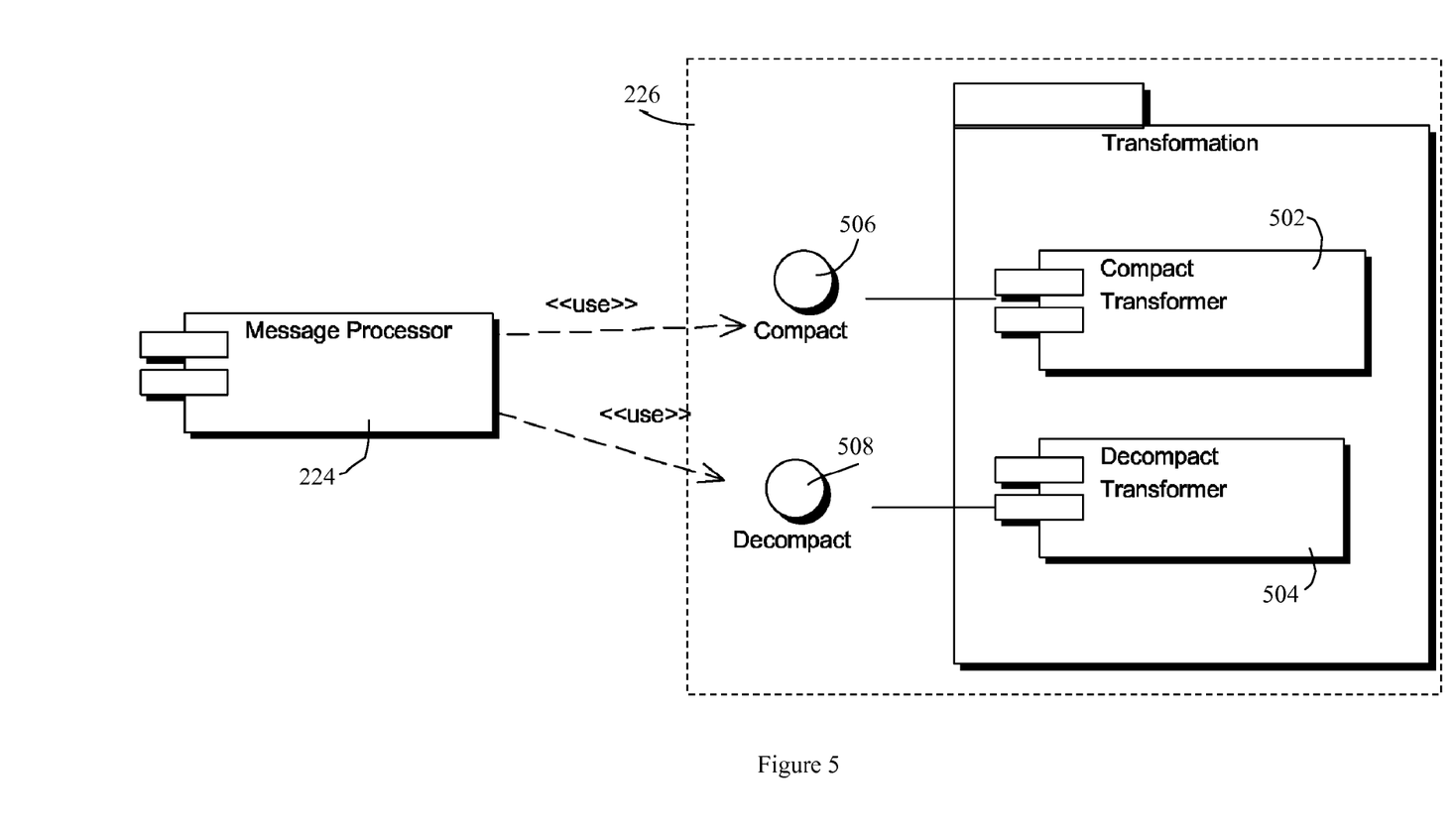
FIG. 5 is a block diagram of a transformer subsystem.

The transformation subsystem 226 transforms messages flowing between the wireless devices 102 and application gateway 106 into either an internal message format or a compact message format. The internal message format is convenient for internal subsystems. The compact message format is used for transmission over the air to the wireless device 102 in order to minimize the bandwidth used.

Referring to FIG. 5, the transformation subsystem 226 is shown in greater detail. The transformation subsystem 226 comprises a compact transformer 502 and a decompact transformer 504, each of which communicate with the message subsystem 224 via a compact interface 506 and a decompact interface 508, respectively. When the message subsystem 224 receives a message from an internal subsystem that is destined for a wireless device 102, it is likely that the message will be in the internal message format. Therefore, the message subsystem 224 transforms the message into the compact message format using the compact transformer 502. When the message subsystem 224 receives a message from a wireless device 102 that is destined for an internal subsystem, it is likely that the message will be in the compact message format. Therefore, the message subsystem 224 transforms the message into the internal message format using the decompact transformer 504. It will be apparent to a person of ordinary skill in the art that custom transformers can be added to the transformation subsystem 226 to facilitate custom message formats.

In order to facilitate the transformation for a given application, the application transformer mapping 460 and WSDL transformer mapping are used for identifying the transformation needs to occur for a given message. It should be noted that a malicious transformer mapping could cause an arbitrary transformation to be performed, which may have negative security implications, such as executing an infinite loop and exhaust system resources. Accordingly, transformer mappings are validated when they are deployed.

Connectors Subsystem

Figure 6:
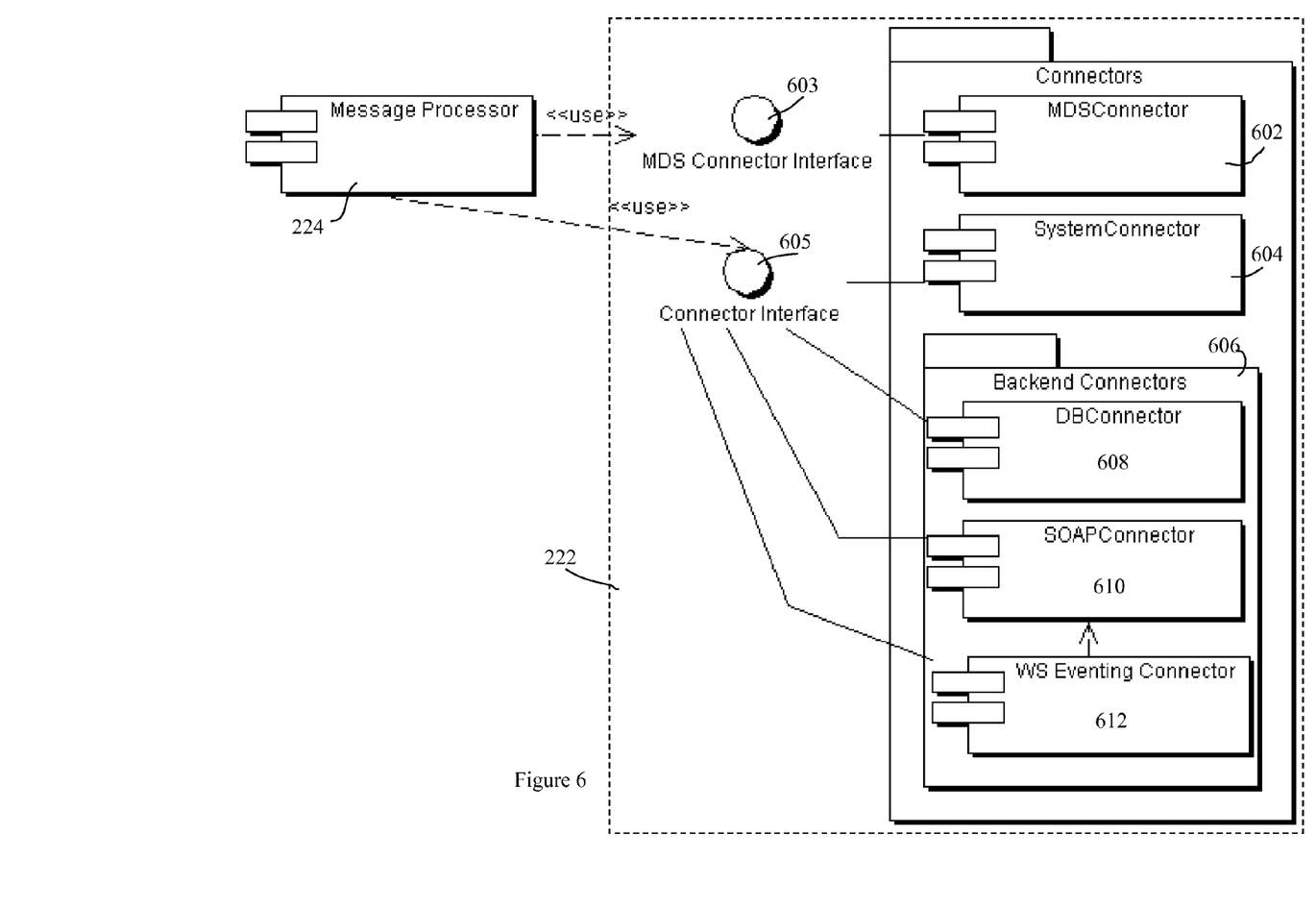
FIG. 6 is a block diagram of a connector subsystem.

The connector subsystem 222 provides transport services between the application gateway 106 and external destination systems using the required transport protocols. Further, the connector subsystem 222 receives synchronous responses from destination systems, and passes them to the message subsystem 224 for processing.

Referring to FIG. 6, a more detailed view of the connector subsystem 222 is shown. The connector subsystem 222 includes a MDS connector 602, a system connector 604 and a set of backend connectors 606. The MDS connector 602 is coupled with the message subsystem 224 via a MDS connector interface 603. The system connector 604 and backend connectors 606 are coupled with the message subsystem 224 via a connector interface 605.

The MDS connector interface 603 is a Java API for message delivery to the wireless devices 102 in the compact message format. The connector interface 605 is a Java API for message delivery to internal subsystems or backend systems. The messages are in the internal message format.

The MDS connector 602 delivers compact messages to the wireless device via the MDS 116. The MDS connector 602 works as push initiator to push messages to wireless devices 102. In the present embodiment the MDS connector 602 supports basic push as well as the reliable push to MDS through the Wireless Application Protocol (WAP) to Push (PAP) standard protocol, although other standards can be supported as they are developed.

The system connector 602 delivers system messages to the lifecycle subsystem 220, the administration subsystem 208, or the messaging subsystem 224. Delivery of system messages to any of the specified subsystems is performed by direct API calls. The system connector receives the messages in the internal message format and performs java API calls to the appropriate subsystem.

The backend connectors 606 include several standard connectors, including a database connector 608, a SOAP connector 610 and a WS Eventing connector 612. Further, both the connector interface 605 and the internal message format will be published and, therefore, third party integrators can implement custom backend connectors as required.

The database connector 608 receives messages in the internal message format and transforms them into Structured Query Language (SQL) statements. The database connector 608 then executes the SQL statements against a destination database server through JDBC. Using mapping information defined for each message, the database connector 608 creates a JDBC connection and prepares and/or executes the SQL statements. The database connector 608 receives the query result from the destination database server 108b and passes it back to the messaging subsystem in the internal message format.

The SOAP connector 610 receives messages in the internal message format, transforms them to SOAP format, and delivers the SOAP request messages to backend Web Services 108 using the Web Service SOAP binding over HTTP protocol. Both Remote Procedure Call (RPC)-style and Document-style Web Services are supported. The SOAP connector 610 also receives synchronous SOAP response messages to each request from backend Web Services, transforms the message to the internal message format, and passes it to the messaging subsystem 224.

The SOAP connector 610 further supports encryption of SOAP messages to Web Service backend destinations through the standard HTTPS protocol. It should be noted that end-to-end security could be achieved if both the application gateway and the secure Web Service are deployed behind the same firewall.

The WS-Eventing connector 612 is a specialized SOAP connector that supports the WS-Eventing protocol for handling WS-Eventing subscription requests.

Accordingly, it will be appreciated by a person skilled in the art that other backend servers 108 can be accessed by providing a corresponding connector. In the present embodiment, this functionality is provided by developing connectors to explicitly implement an extended WSDL document. The binding and service elements of the WSDL document are programmed specifically to take advantage of the corresponding connector.

Transformer Mapping

In the present embodiment, for example, the compact message format is a minimal messaging format, which may or may not be binary coded, and the internal message format is compliant with WSDL.

Figure 7:
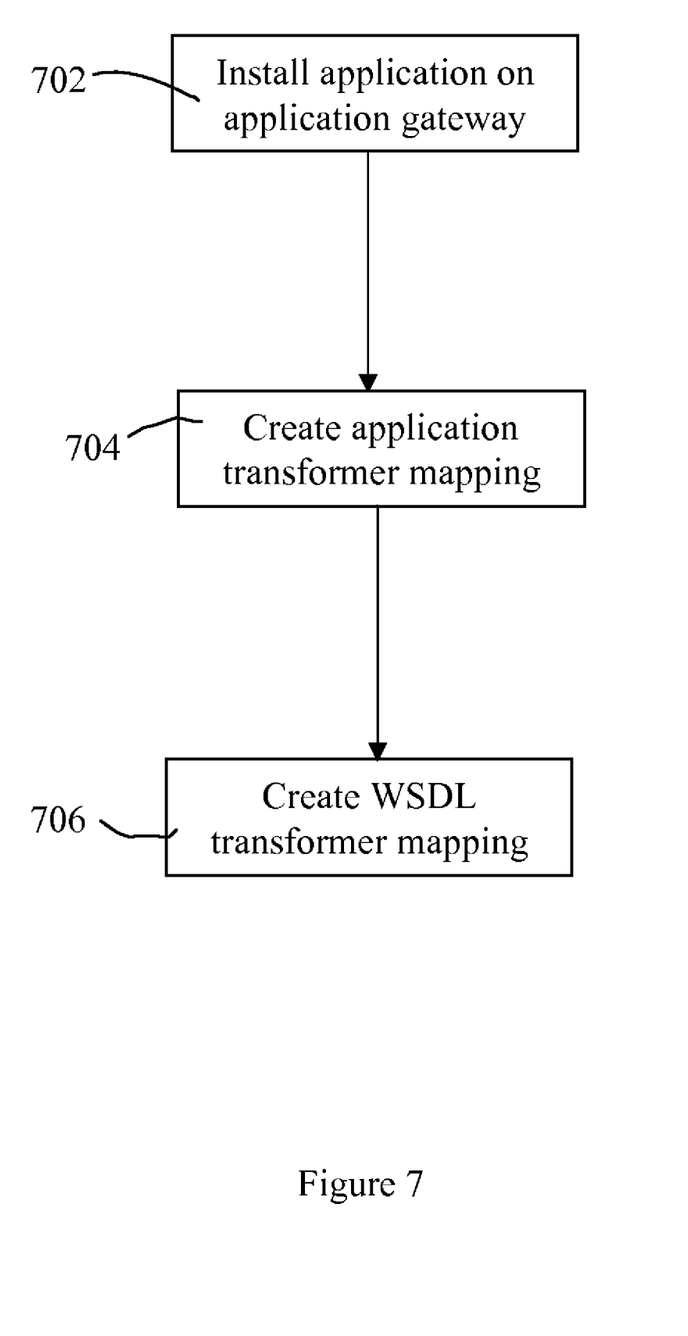
FIG. 7 is a flow chart illustrating the operation of mapping messages from a compact format to an internal format.

Referring to FIG. 7, the operation of creating the application transformer mapping 460 is illustrated generally by numeral 700. In step 702, an application is installed on the application gateway, which is provided with a bundle including the application definition 454, the mapping document 456, and the WSDL document 458.

In step 704, mapping module 452 parses the mapping document 456 and the application definition 454 and creates a list of the operations used by the application. The mapping module 452 also creates the field binding path for fields in the messages used by the application and a corresponding look up table. This combination of information is referred to as the application transformer mapping 460. In step 706, the mapping module 452 parses the mapping document 456 and the WSDL document 458 and creates the WSDL transformer mapping 462.

This operation can be exemplified with reference to the WSDL document illustrated in Appendix C, the mapping document illustrated in Appendix B, and a corresponding relevant portion of a component application definition illustrated in Appendix D.

In step 702, the mapping document is parsed and the list of operations used by the application is retrieved. In the present example only one operation "whatCar" is used.

In step 704, a field binding path is created for each field in each message in the mapping document. These fields include "plate", "name", "phoneNumber", "emailAddr", "make", and "year", and the field binding path is:

| | | |
|---|---|---|
| plate | -> | plate |
| plate | -> | car/impl:plate |
| name | -> | car/impl:owner/impl:name |
| phoneNumber | -> | car/impl:owner/impl:phoneNumber |
| emailAddr | -> | car/impl:owner/impl:emailAddr |
| make | -> | car/impl:make |
| year | -> | car/impl:year |

Further, a lookup table is created with tags for each field in lookup table labelled in accordance with the second column of the field binding path.

In step 706, it is realized that the WSDL transformer mapping 462 is, in fact, the fully qualified WSDL path. Accordingly, it will be appreciated that the second column in the field binding path corresponds with the fully qualified WSDL path and an additional lookup table does not need to be created. Rather, upon parsing the WSDL document and the field binding path, the correlation between the WSDL message definitions and the application message can be determined.

Figure 8:
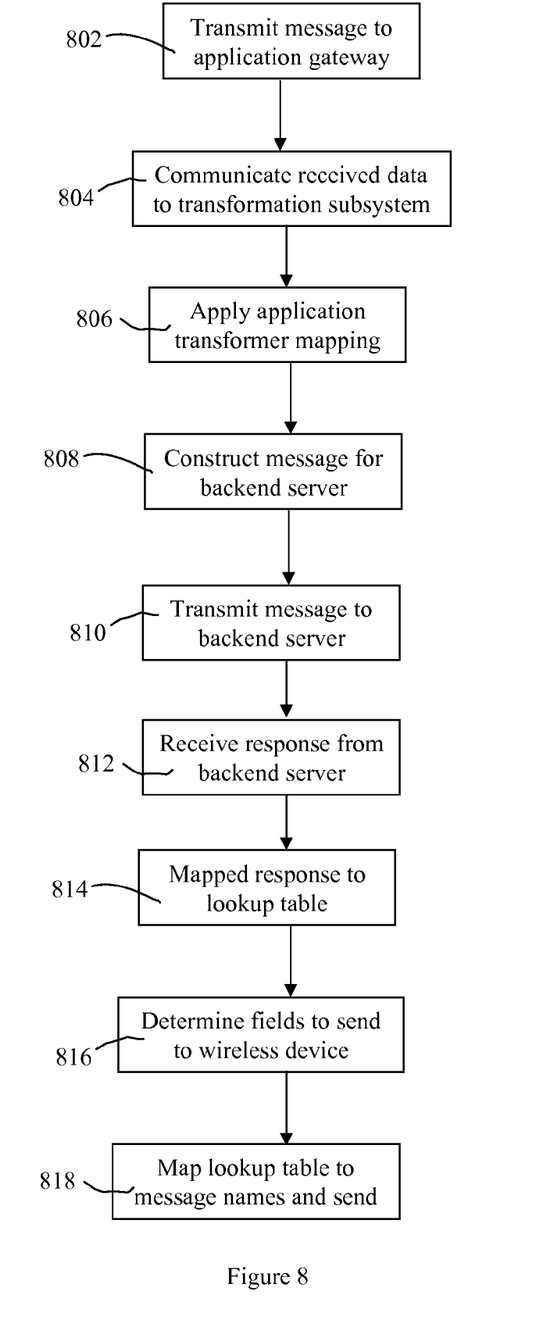
FIG. 8 is a flow chart illustrating the operation of mapping messages from an internal format to a compact format.

Referring to FIG. 8, a flow chart illustrating the operation of using the created transformer mappings for facilitating communication between an application on a wireless device and the connector is illustrated generally by numeral 800. In step 802, the wireless device transmits a message to the application gateway, the message including one or more tags and associated data. In step 804, the application gateway receives the message, identifies the originating application, and communicates the information to the transformation subsystem. In step 806, the decompactor retrieves the corresponding application transformer mapping and applies it to the received message for populating the lookup table with the appropriate message values.

In step 808, the transformation subsystem constructs the outgoing message to be sent to the backend server. The transformation subsystem uses the WSDL transformer mapping to retrieve the received data from the lookup table for constructing the request. If a required value was not received from the application, a default value or predefined value may be used. In step 810, the outgoing message is transmitted to the connector subsystem for transmission to the backend server. The connector subsystem encapsulates the message is defined by a binding element of the WSDL document and connects with the backend server in accordance with a service element of the WSDL document.

In step 812, a response is received from the backend server at the transformation subsystem via the connector subsystem. In step 814, the response is mapped to the lookup table using the WSDL transformer mapping 462 and the field names as keys. In step 816, the compactor determines which fields of the lookup table the application is expecting as part of the response. In step 818, the values from the lookup table are applied to the corresponding message fields and are transmitted from the application gateway to the wireless device.

This operation can be exemplified by continuing the previous example. In step 802, the application transmits a message named "whatCarReq" comprising field name "plate" having a value "ABC123". In step 806, the decompactor applies the application transformer mapping 460 and stores "ABC123" in lookup table field named "plate"

In step 808, the transformation subsystem determines that for the operation "whatCar", the input message "impl:whatCarReq" has only one part named "plate", which maps to "plate". Accordingly, the lookup table is parsed for the value of "plate" and the request constructed is as follows:

```
<whatCarReq xmlns:m="http://map.rim.net.samplesc" >
    <plate >ABC123</plate>
</whatCarReq>
```

In step 812, a response is received in the form:

```
<whatCar xmlns:m="http://map.rim.net.samplesc" >
    <ecar >
        <owner>
            <name>Sherlock</name>
            <phoneNumber >5556666</phoneNumber>
            <emailAddr >sh@mail.com</emailAddr>
        </owner>
        <make>Jaguar</make>
        <year>1977</year>
    </ecar>
</whatCar>
```

In step 814 the transformation subsystem parses the response so that it is in the following form:

| | |
|---|---|
| car/impl:owner/impl:name | -> Sherlock |
| car/impl:owner/impl:phoneNumber | -> 5556666 |
| car/impl:owner/impl:emailAddr | -> sh@mail.com |
| car/impl:make | -> Jaguar |
| car/impl:year | ->1977 |

Once the data has been parsed it is mapped to the lookup table using the previously defined WSDL transformer mapping 462, which is simply the fully qualified WSDL document listed above.

In step 816, the transformation subsystem determines that the response to be sent to the wireless device include the field "car", which is a complex type comprising "owner", "make", and "year". Further, owner is a complex type comprising "name", "phoneNumber", and "emailAddress". Therefore, the fields that need to be sent to the wireless device include "name", "phoneNumber", "emailAddress", "make", and "year". Accordingly, in step 818, the values for these fields are retrieved from the lookup table using the field binding path of application transformation mapping 460 and transmitted to the wireless device.

Accordingly, it will be appreciated that the transformation and mapping subsystems described above, and the operations thereof, decouple the definition and structure of messages in an application from the WSDL definition of the messages to be communicated with the backend server. Thus, an application developer has the flexibility to create completely a different structure for application to that defined for the backend server if desired, as long as the required values are provided in the message fields.

Although the embodiment described above refers specifically to WSDL and XML, a person of ordinary skill will appreciate that the standards described herein can be adapted to conform to other standards or proprietary schema that provide similar functionality, as desired.

Further, although preferred embodiments of the invention have been described herein, it will be understood by those skilled in the art that variations may be made thereto without departing from the scope of the appended claims.

APPENDIX A

```xml
<?xml version="1.0" encoding="UTF-8"?>
<xsd:schema targetNamespace="http://com.rim.wica/mapping.xsd"
 xmlns:map="http://com.rim.wica/mapping.xsd" xmlns:xsd="http://www.w3.org/2001/XMLSchema">
    <xsd:simpleType name="ComponentMapType">
        <xsd:restriction base="xsd:NCName">
            <xsd:enumeration value="message"/>
            <xsd:enumeration value="complexType"/>
            <xsd:enumeration value="element"/>
        </xsd:restriction>
    </xsd:simpleType>
    <xsd:simpleType name="FieldMapType">
        <xsd:restriction base="xsd:NCName">
            <xsd:enumeration value="part"/>
            <xsd:enumeration value="simpleType"/>
            <xsd:enumeration value="element"/>
            <xsd:enumeration value="attribute"/>
            <xsd:enumeration value="any"/>
            <xsd:enumeration value="anyAttribute"/>
        </xsd:restriction>
    </xsd:simpleType>
    <xsd:complexType name="ComponentReference">
        <xsd:attribute name="component" type="xsd:string"/>
    </xsd:complexType>
    <xsd:element name="ComponentReference" type="map:ComponentReference"/>
    <xsd:complexType name="ComponentType">
        <xsd:sequence>
            <xsd:element name="fields" type="map:FieldType" minOccurs="0" maxOccurs="unbounded"/>
        </xsd:sequence>
        <xsd:attribute name="mapName" type="xsd:string"/>
        <xsd:attribute name="mapType" type="map:ComponentMapType" default="message"/>
        <xsd:attribute name="name" type="xsd:string"/>
        <xsd:attribute name="secure" type="xsd:string" default="false"/>
    </xsd:complexType>
    <xsd:element name="ComponentType" type="map:ComponentType"/>
    <xsd:complexType name="ConnectorType">
        <xsd:sequence>
            <xsd:element name="any" type="xsd:string" nillable="true" minOccurs="0"/>
            <xsd:element name="anyAttribute" type="xsd:string" nillable="true" minOccurs="0" maxOccurs="unbounded"/>
        </xsd:sequence>
        <xsd:attribute name="name" type="xsd:string" default="SOAPCONNECTOR"/>
    </xsd:complexType>
    <xsd:element name="ConnectorType" type="map:ConnectorType"/>
    <xsd:complexType name="CorrelationType">
        <xsd:attribute name="field" type="xsd:string"/>
    </xsd:complexType>
    <xsd:element name="CorrelationType" type="map:CorrelationType"/>
    <xsd:complexType name="DocumentRoot">
        <xsd:sequence>
            <xsd:element name="mixed" type="xsd:string" nillable="true" minOccurs="0" maxOccurs="unbounded"/>
```

APPENDIX A-continued

```
        </xsd:sequence>
    </xsd:complexType>
    <xsd:element name="DocumentRoot" type="map:DocumentRoot"/>
    <xsd:complexType name="EnumerationType">
        <xsd:sequence>
            <xsd:element name="literals" type="map:LiteralType" maxOccurs="unbounded"/>
        </xsd:sequence>
        <xsd:attribute name="mapName" type="xsd:string"/>
        <xsd:attribute name="name" type="xsd:string"/>
    </xsd:complexType>
    <xsd:element name="EnumerationType" type="map:EnumerationType"/>
    <xsd:complexType name="FieldType">
        <xsd:attribute name="mapName" type="xsd:string"/>
        <xsd:attribute name="mapType" type="map:FieldMapType" default="part"/>
        <xsd:attribute name="name" type="xsd:string"/>
    </xsd:complexType>
    <xsd:element name="FieldType" type="map:FieldType"/>
    <xsd:complexType name="FilterType">
        <xsd:attribute name="component" type="xsd:string"/>
        <xsd:attribute name="expression" type="xsd:string"/>
    </xsd:complexType>
    <xsd:element name="FilterType" type="map:FilterType"/>
    <xsd:complexType name="ImplicitMapType">
        <xsd:attribute name="component" type="xsd:string"/>
        <xsd:attribute name="operation" type="xsd:string"/>
        <xsd:attribute name="portType" type="xsd:string"/>
    </xsd:complexType>
    <xsd:element name="ImplicitMapType" type="map:ImplicitMapType"/>
    <xsd:complexType name="InputType">
        <xsd:complexContent>
            <xsd:extension base="map:ComponentReference">
                <xsd:sequence>
                    <xsd:element name="correlations" type="map:CorrelationType" minOccurs="0" maxOccurs="unbounded"/>
                </xsd:sequence>
            </xsd:extension>
        </xsd:complexContent>
    </xsd:complexType>
    <xsd:element name="InputType" type="map:InputType"/>
    <xsd:complexType name="LiteralType">
        <xsd:attribute name="mapValue" type="xsd:string"/>
        <xsd:attribute name="value" type="xsd:string"/>
    </xsd:complexType>
    <xsd:element name="LiteralType" type="map:LiteralType"/>
    <xsd:complexType name="OperationType">
        <xsd:sequence>
            <xsd:element name="input" type="map:InputType"/>
            <xsd:element name="output" type="map:ComponentReference"/>
            <xsd:element name="bindingInputHeader" type="map:InputType" minOccurs="0"/>
        </xsd:sequence>
        <xsd:attribute name="name" type="xsd:string"/>
    </xsd:complexType>
    <xsd:element name="OperationType" type="map:OperationType"/>
    <xsd:complexType name="PortType">
        <xsd:sequence>
            <xsd:element name="operations" type="map:OperationType" minOccurs="0" maxOccurs="unbounded"/>
        </xsd:sequence>
        <xsd:attribute name="name" type="xsd:string"/>
    </xsd:complexType>
    <xsd:element name="PortType" type="map:PortType"/>
    <xsd:complexType name="SubscriptionType">
        <xsd:sequence>
            <xsd:element name="filter" type="map:FilterType" minOccurs="0"/>
            <xsd:element name="notification" type="map:ComponentReference"/>
            <xsd:element name="subscribe" type="map:ImplicitMapType"/>
            <xsd:element name="unsubscribe" type="map:ImplicitMapType"/>
            <xsd:element name="subscriptionEnd" type="map:ImplicitMapType"/>
        </xsd:sequence>
        <xsd:attribute name="expiryDelta" type="xsd:string"/>
    </xsd:complexType>
    <xsd:element name="SubscriptionType" type="map:SubscriptionType"/>
    <xsd:complexType name="WCAType">
        <xsd:sequence>
            <xsd:element name="connector" type="map:ConnectorType"/>
            <xsd:element name="enumerations" type="map:EnumerationType" minOccurs="0" maxOccurs="unbounded"/>
            <xsd:element name="components" type="map:ComponentType"
```

APPENDIX A-continued

```
maxOccurs="unbounded"/>
        <xsd:element name="portTypes" type="map:PortType"
maxOccurs="unbounded"/>
        <xsd:element name="subscription" type="map:SubscriptionType"
minOccurs="0" maxOccurs="unbounded"/>
      </xsd:sequence>
    </xsd:complexType>
    <xsd:element name="WCAType" type="map:WCAType"/>
</xsd:schema>
```

APPENDIX B

```
<?xml version="1.0" encoding="ASCII"?>
<map:wiclet xmlns:impl="http://map.rim.net.samples/"
xmlns:map="http://com.rim.wica/mapping.xsd"
xmlns:wsdl="http://schemas.xmlsoap.org/wsdl/"
xmlns:wsdljdbc="http://net.rim.wica.tools.studio.datasource.connector.jdbc/"
xmlns:xsd="http://www.w3.org/2001/XMLSchema" xmlns:yz="http://yz.schemas">
    <map:component map:mapName="impl:whatCarReq" map:mapType="message"
map:name="whatCarReq" map:secure="false">
      <map:field map:mapName="plate" map:mapType="part" map:name="plate"/>
    </map:component>
    <map:component map:mapName="impl:whatCarResp" map:mapType="message"
map:name="whatCarResp" map:secure="false">
      <map:field map:mapName="car" map:mapType="part" map:name="car"/>
    </map:component>
    <map:component map:mapName="impl:Owner" map:mapType="complexType" map:name="Owner">
      <map:field map:mapName="impl:name" map:mapType="element" map:name="name"/>
      <map:field map:mapName="impl:phoneNumber" map:mapType="element"
map:name="phoneNumber"/>
      <map:field map:mapName="impl:emailAddr" map:mapType="element"
map:name="emailAddr"/>
    </map:component>
    <map:component map:mapName="impl:CarRecd" map:mapType="complexType"
map:name="CarRecd">
      <map:field map:mapName="impl:plate" map:mapType="element" map:name="plate"/>
      <map:field map:mapName="impl:owner" map:mapType="element" map:name="owner"/>
      <map:field map:mapName="impl:make" map:mapType="element" map:name="make"/>
      <map:field map:mapName="impl:year" map:mapType="element" map:name="year"/>
    </map:component>
    <map:portType map:name="impl:CarId">
      <map:operation map:name="whatCar">
        <map:input map:component="whatCarReq"/>
        <map:output map:component="whatCarResp"/>
      </map:operation>
    </map:portType>
</map:wiclet>
```

APPENDIX C

```
<wsdl:definitions xmlns="http://schemas.xmlsoap.org/wsdl/"
xmlns:wsdl="http://schemas.xmlsoap.org/wsdl/"
xmlns:apachesoap="http://xml.apache.org/xml-soap"
xmlns:impl="http://map.rim.net.samples/"
xmlns:soapenc="http://schemas.xmlsoap.org/soap/encoding/"
xmlns:wsdljdbc=
"http://net.rim.wica.tools.studio.datasource.connector.jdbc/"
xmlns:xsd="http://www.w3.org/2001/XMLSchema"
xmlns:yz="http://yz.schemas"
xmlns:soap="http://schemas.xmlsoap.org/wsdl/soap/"
targetNamespace="http://map.rim.net.samples/">
<wsdl:types>
    <xsd:schema elementFormDefault="qualified"
    targetNamespace="http://map.rim.net.samples/">
      <xsd:element name="ecar" type="impl:CarRecd"/>
      <xsd:complexType name="CarRecd">
        <xsd:sequence>
          <xsd:element name="plate" type="xsd:string"/>
          <xsd:element name="owner" type="impl:Owner"/>
          <xsd:element name="make" type="xsd:string"/>
          <xsd:element name="year" type="xsd:int"/>
        </xsd:sequence>
      </xsd:complexType>
      <xsd:complexType name="Owner">
        <xsd:sequence>
```

APPENDIX C-continued

```
          <xsd:element name="name" type="xsd:string"/>
          <xsd:element name="phoneNumber" type="xsd:string"/>
          <xsd:element name="emailAddr" type="xsd:string"/>
        </xsd:sequence>
      </xsd:complexType>
    </xsd:schema>
</wsdl:types>
<message name="whatCarReq">
    <part name="plate" type="xsd:string"/>
</message>
<message name="whatCarResp">
    <part name="car" element="impl:ecar"/>
</message>
<portType name="CarId">
    <operation name="whatCar">
      <input message="impl:whatCarReq"/>
      <output message="impl:whatCarResp"/>
    </operation>
</portType>
<binding name="CarIdBinding" type="impl:CarId">
    <soap:binding style="document"
transport="http://schemas.xmlsoap.org/soap/http"/>
    <operation name="whatCar">
      <input>
        <soap:body use="literal" >
```

APPENDIX C-continued

```
        </input>
        <output>
            <soap:body use="literal"/>
        </output>
    </operation>
</binding>
<service name="CarIdService">
    <port name="ExpenseServiceIFPort" binding="impl:CarIdBinding">
        <soap:address location="http://SNEEZY-
YYZ.rim.net:9000/expenseservice/expense"
xmlns:wsdl="http://schemas.xmlsoap.org/wsdl/"/>
    </port>
</service>
</wsdl:definitions>
```

APPENDIX D

```
<data name="Owner" >
    <field name="name"/>
    <field name="phoneNumber"/>
    <field name="emailAddr"/>
</data>
<data name="CarRecd" >
    <field name="plate"/>
    <field name="owner" type="data" component="Owner"/>
    <field name="make"/>
    <field name="year" type="integer"/>
</data>
<message name="whatCarReq" >
    <field name="plate" type="data" component ="CarReq"/>
</message>
<message name="whatCarResp" >
    <field name="car" type="data" component ="CarRecd"/>
</message>
```

What is claimed is:

1. An application gateway configured to facilitate message communication between an application executing on a wireless device and a backend server, the application gateway comprising:
 a message interface for facilitating communication of a plurality of message elements according to a first format between the wireless device and the application gateway;
 a backend connector for facilitating communication between the application gateway and the backend server using a second format; and
 a transformer for translating data between the first format and the second format, the transformer including
 a buffer;
 an application transformer mapping document for populating the buffer with the plurality of message elements; and
 a WSDL transformer mapping document for mapping data from the buffer to the second format for communication to the backend server.

2. The application gateway of claim 1, wherein the transformer mapping document comprises an application transformer document for providing a field binding path between application messages and a fully qualified version of the internal format.

3. The application gateway as defined in claim 1, wherein the second format comprises distinct elements for decoupling translation requirement from connectivity requirements.

4. The application gateway as defined in claim 1, wherein the second format is WSDL compatible.

5. A computer-implemented method for translating data from a first format used for communicating with a wireless device to second format used for facilitating communication with a backend server, the method comprising the steps of:
 receiving, at a backend connector, a plurality of message elements in the first format;
 retrieving a corresponding application transformer mapping document and using it to populate a lookup table with the plurality of message elements;
 mapping data from the lookup table to the second format in accordance with a WSDL transformer mapping document for communication to the backend server; and
 transmitting the data in the second format to the backend server.

6. The method of claim 5, wherein the step of mapping data further comprises the step of mapping data from the first format to a fully qualified version of the second format using a field binding path.

7. A memory having instructions stored thereon, which, when executed on a processor, cause the processor to implement the method of claim 5.

8. A computer-implemented method for translating data from a first format used for facilitating communication with a backend server to a second format used for communicating with a wireless device, the method comprising the steps of:
 receiving at a backend connector a plurality of data elements in the first format;
 mapping data from the plurality of data elements to a lookup table in accordance with a WSDL transformer mapping document;
 retrieving an application transformer mapping document; and
 applying the plurality of data elements from the lookup table to a message in the second format using the application transformer mapping document; and
 transmitting the message in the second format to the wireless device.

9. The method of claim 8, wherein the step of mapping data further comprises the step of mapping data from a fully qualified version of the first format to the second format using a field binding path.

10. A memory having instructions stored thereon, which, when executed on a processor, cause the processor to implement the method of claim 8.

11. An application gateway configured to facilitate data communication between an application executing on a wireless device and a backend server, the application gateway comprising:
 a message interface for facilitating data communication between the wireless device and the application gateway in a first format;
 a backend connector for facilitating communication between the application gateway and the backend server using second format; and
 a transformer for translating data between the first format and the second format, the transformer comprising:
 an intermediary buffer;
 a WSDL transformer mapping document for mapping data in the second format to the intermediary buffer; and
 an application transformer mapping document for data from the intermediary buffer to a message in the first format to be sent to the wireless device.

12. An application gateway configured to facilitate message communication between an application executing on a wireless device and a backend server, the application gateway comprising:

a message interface for facilitating communication of a plurality of message elements according to a first format between the wireless device and the application gateway;

a backend connector for facilitating communication between the application gateway and the backend server using a second format; and a transformer for translating data between the first format and the second format, the transformer including a-buffer;

a first mapping document for populating the buffer with the plurality of message elements; and a second mapping document for mapping data from the buffer to the second format for communication to the backend server.

13. The application gateway of claim 12, wherein the first mapping document comprises an application transformer document for providing a field binding path between application messages and a fully qualified version of the internal format.

14. A computer-implemented method for translating data from a first format used for facilitating communication with a backend server to a second format used for communicating with a wireless device, the method comprising the steps of:

receiving at a backend connector a plurality of data elements in the first format;

mapping data from the plurality of data elements to a lookup table in accordance with a first mapping document;

retrieving a second mapping document; and applying the plurality of data elements from the lookup table to a message in the second format using the second mapping document; and transmitting the message in the second format to the wireless device.

* * * * *